United States Patent
Yeh

(10) Patent No.: US 10,057,516 B2
(45) Date of Patent: Aug. 21, 2018

(54) IMAGE SENSOR AND IMAGE CAPTURE DEVICE SUPPORTING ROLLING SHUTTER MECHANISM AND GLOBAL SHUTTER MECHANISM

(71) Applicant: PIXART IMAGING INC., Hsin-Chu (TW)

(72) Inventor: Mei-Chao Yeh, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/152,322

(22) Filed: May 11, 2016

(65) Prior Publication Data

US 2017/0195593 A1 Jul. 6, 2017

(30) Foreign Application Priority Data

Jan. 6, 2016 (TW) .............................. 105100310 A

(51) Int. Cl.
*H04N 5/353* (2011.01)
*H04N 5/374* (2011.01)
*H04N 5/235* (2006.01)
*H04N 5/3745* (2011.01)

(52) U.S. Cl.
CPC ......... *H04N 5/3532* (2013.01); *H04N 5/2353* (2013.01); *H04N 5/3745* (2013.01)

(58) Field of Classification Search
CPC .................................................. H04N 5/3532
See application file for complete search history.

(56) References Cited

U.S. PATENT DOCUMENTS

| 9,041,583 | B2* | 5/2015 | Tanaka | H04N 5/3745 341/169 |
| 9,838,626 | B2* | 12/2017 | Nagai | H04N 5/363 |
| 2005/0057387 | A1* | 3/2005 | Janakiraman | H03M 1/06 341/156 |
| 2010/0271247 | A1* | 10/2010 | Lee | H03M 1/1019 341/155 |
| 2011/0242381 | A1* | 10/2011 | Sakakibara | H04N 5/355 348/301 |
| 2013/0062500 | A1* | 3/2013 | Oh | G01S 17/89 250/201.1 |

(Continued)

*Primary Examiner* — Cynthia Segura
(74) *Attorney, Agent, or Firm* — Li & Cai Intellectual Property (USA) Office

(57) ABSTRACT

The present disclosure illustrates an image sensor. The image sensor includes an image sensing array and a voltage supply array. The image sensing array and the voltage supply array are coupled to an analog-to-digital converter array. The image sensing array captures image data. The image sensing array supports one of a rolling shutter mechanism and a global shutter mechanism according to setting. The voltage supply array includes a plurality of voltage supply circuits to supply dummy voltage. During an auto-zero period, the voltage supply array provides the dummy voltage to the analog-to-digital converter array. Pluralities of comparators of the analog-to-digital converter array execute an auto-zero function based on the dummy voltage. After finishing the auto-zero function, the image sensing array outputs the image data to the analog-to-digital converter array. The analog-to-digital converter array makes the image data be digital.

20 Claims, 3 Drawing Sheets

(56) References Cited

U.S. PATENT DOCUMENTS

| | | | |
|---|---|---|---|
| 2013/0100326 A1* | 4/2013 | Ueno | H03F 3/72 |
| | | | 348/300 |
| 2014/0232916 A1* | 8/2014 | Nagai | H03M 1/56 |
| | | | 348/302 |
| 2014/0293104 A1* | 10/2014 | Tanaka | H04N 5/3745 |
| | | | 348/301 |
| 2015/0163403 A1* | 6/2015 | Wakabayashi | H04N 5/378 |
| | | | 348/308 |
| 2015/0237278 A1* | 8/2015 | Sakakibara | H04N 5/3698 |
| | | | 348/301 |
| 2016/0353972 A1* | 12/2016 | Yano | A61B 1/045 |
| 2017/0062497 A1* | 3/2017 | Goto | H01L 27/1463 |
| 2017/0134677 A1* | 5/2017 | Nishihara | H04N 5/361 |
| 2017/0288691 A1* | 10/2017 | Nagai | H03M 1/56 |
| 2018/0091752 A1* | 3/2018 | Ebihara | H03K 5/2481 |

* cited by examiner

IMAGE SENSOR AND IMAGE CAPTURE DEVICE SUPPORTING ROLLING SHUTTER MECHANISM AND GLOBAL SHUTTER MECHANISM

BACKGROUND OF THE INVENTION

1. Field of the Invention

The instant disclosure relates to an image sensor; in particular, to an image sensor that can support both the rolling shutter mechanism and the global shutter mechanism, and relates to an image capture device using the same.

2. Description of Related Art

With the development of the photoelectric products, the requirements in regard to the image sensor are stricter. The image sensors can be generally classified into two types. One is the complementary metal-oxide-semiconductor (CMOS) image sensor, and the other one is the charge-coupled device (CCD) image sensor. The CMOS sensor is characterized by low power consumption and less manufacturing cost, and thus has been widely used in photoelectric products.

The image sensor comprises a plurality of pixels arranged in a matrix and a plurality of comparators. In the case that the image sensor has the configuration of the column analog-to-digital converter, the pixels in the same column are connected to the same comparator. Each pixel detects the brightness information and correspondingly generates image data. Each pixel commonly comprises a light-sensing element and a reading circuit composed of at least one output transistor. Specifically, the light-sensing element detects the incident light, and correspondingly outputs and stores charges into the floating diffusion region. The output transistor converts the charges stored in the floating diffusion region to image data and outputs the image data to the comparator. The comparator outputs a corresponding comparison result image data to the image processing circuit according to the image data and a reference voltage to generate corresponding images.

The current image sensors can support two kinds of shutter mechanisms, which are the rolling shutter mechanism and the global shutter mechanism. When the image sensor is working under the rolling shutter mechanism, the pixels are row by row exposed, and image data are generated and row by row provided to the comparator. On the other hand, when the image sensor is working under the global shutter mechanism, all pixels are simultaneously exposed, and row by row provide image data to the comparator.

Each comparator has different voltages when it is working under the rolling shutter mechanism and under the global shutter mechanism. Generally, the current image sensors use two kinds of comparators and the corresponding image processing circuits to respectively process the image data under the rolling shutter mechanism and under the global shutter mechanism. If the same comparator and the corresponding image processing circuit are used to process the image data under the rolling shutter mechanism and under the global shutter mechanism, the various voltage requirements of the comparator will result in difficulty and complexity for designing the comparator. However, using two kinds of comparators and the corresponding image processing circuits to respectively process the image data under the rolling shutter mechanism and under the global shutter mechanism has greater cost and requires a larger element area.

SUMMARY OF THE INVENTION

The instant disclosure provides an image sensor, and the image sensor is connected to an analog-to-digital converter array, wherein the analog-to-digital converter array comprises a plurality of comparators. The image sensor comprises an image sensing array and a voltage supply array. The image sensing array captures image data and comprises a plurality of pixels. The image sensing array is set to support the rolling shutter mechanism or the global shutter mechanism. The voltage supply array is connected to the analog-to-digital converter array, and comprises a plurality of voltage supply circuits to provide a dummy voltage. During an auto-zero period, the voltage supply array provides the dummy voltage to the analog-to-digital converter array, and the comparators execute an auto-zero function according to the dummy voltage. The image sensing array outputs the image data signal to the analog-to-digital converter array after the comparators complete the auto-zero function. The analog-to-digital converter array converts the image data signal to digital image data signal.

The instant disclosure further provides an image capture device, and the image capture device comprises an image capture sensor and an image sensor. The image capture sensor comprises a plurality of comparators. The image sensor is connected to the analog-to-digital converter array, and comprises an image sensing array and a voltage supply array. The image sensing array captures image data, and comprises a plurality of pixels. The image sensing array is set to support the rolling shutter mechanism and or the global shutter mechanism. The voltage supply array is connected to the analog-to-digital converter array, and comprises a plurality of voltage supply circuits to provide a dummy voltage. During an auto-zero period, the voltage supply array provides the dummy voltage to the analog-to-digital converter array, and the comparators execute an auto-zero function according to the dummy voltage. The image sensing array outputs the image data signal to the analog-to-digital converter array after the comparators complete the auto-zero function, and the analog-to-digital converter array converts the image data signal to a digital image data signal.

To sum up, in the image sensor and the image capture device using the same provided by the instant disclosure, the voltage supply array can provide a stable dummy voltage to the comparator of the analog-to-digital converter array. The image capture device uses the same analog-to-digital converter array and the same image processing circuit which can support both the rolling shutter mechanism and the global shutter mechanism, to generate images. Compared with the conventional image capture devices, the image sensor and the image capture device using the same provided by the instant disclosure have a simplified circuit design which decreases the manufacturing difficulty and the manufacturing cost.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It should be understood that, although the terms first, second, third, and the like, may be used herein to describe various elements, these elements should not be limited by these terms. These terms are only to distinguish one element from another region or section discussed below. For example, a first element could be termed a second element and, similarly, a second element could be termed a first element, without departing from the teachings of the instant disclosure. As used herein, the term "and/or" includes any and all combinations of one or more of the associated listed items.

Figure 1:
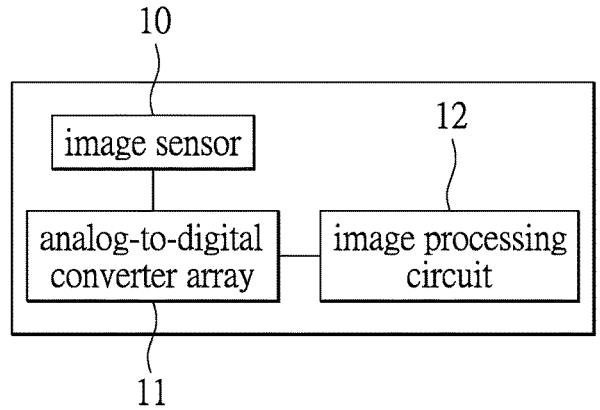
FIG. 1 shows a schematic diagram of an image capture device of one embodiment of the instant disclosure.

Refer to FIG. 1. FIG. 1 shows a schematic diagram of an image capture device of one embodiment of the instant disclosure. The image capture device 1 comprises an image sensor 10, an analog-to-digital converter array 11 and an image processing circuit 12. The image sensor 10 is connected to the analog-to-digital converter array 11. The analog-to-digital converter array 11 is connected to the image processing circuit 12.

The image capture device 1 can be applied to electric devices having an imaging function, such as a digital camera, digital camcorder, driving recorder, car navigation system, scanner, web camera, video phone and surveillance system. However, it is not limited herein.

The image sensor 10 can be, for example, the complementary metal-oxide-semiconductor (CMOS) image sensor and the charge-coupled device (CCD) image sensor. The image sensor 10 captures image data, and outputs the image data signal to the analog-to-digital converter array 11. The detailed configuration of the image sensor 10 is illustrated as follows.

The analog-to-digital converter array 11 comprises proper logics, circuits and/or coding, and is configured to convert the analog image data signal into the digital image data, wherein the digital image data are written in binary codes. After that, the analog-to-digital converter array 11 outputs the digital image data signal to the image processing circuit 12. The detailed configuration of the analog-to-digital converter array 11 is illustrated as follows.

The image processing circuit 12 comprises proper logics, circuits and/or coding, and is configured to obtain real images from the digital image data signal or to process the digital image data signal. For example, the image processing circuit 12 can implement the pixel luminance compensation and the pixel integrated process for the digital image data signal. The image processing circuit 12 has a pixel compensation mechanism that can compensate the pixel luminance for the digital image data signal according to the surrounding illumination and the conversion gain of each pixel.

Figure 2:
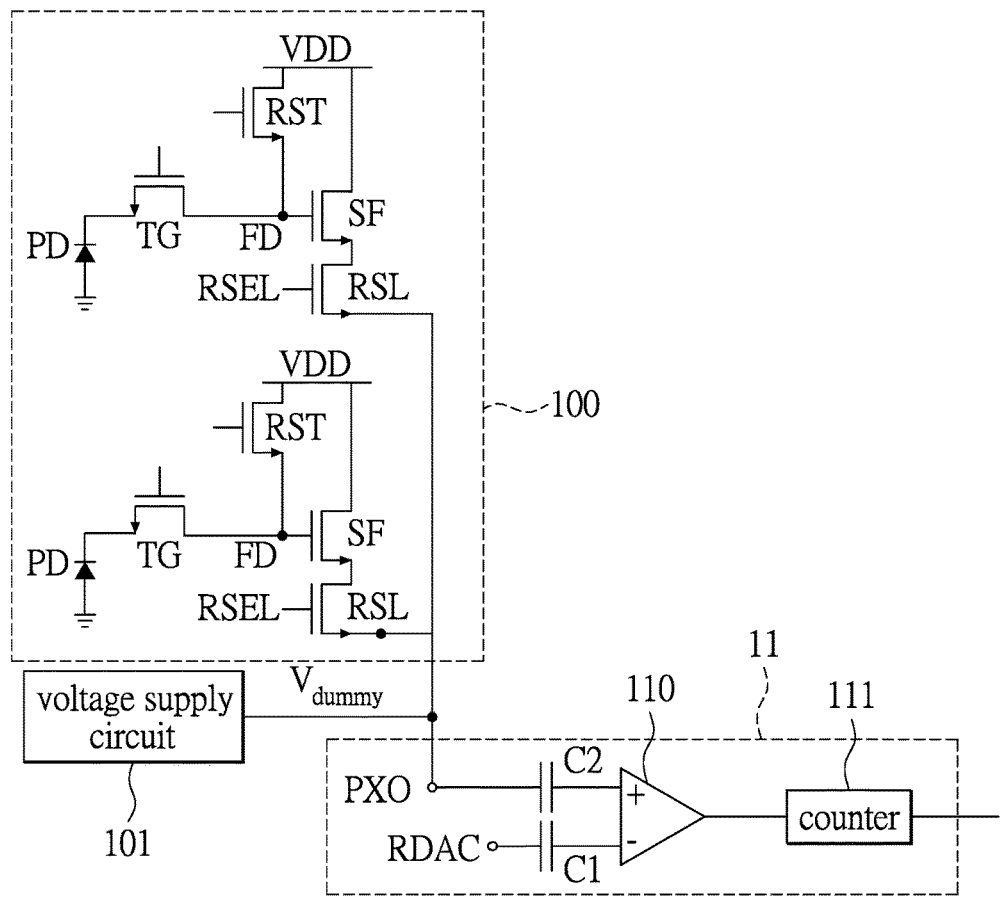
FIG. 2 shows a schematic diagram of an image sensor and an analog-to-digital converter array of one embodiment of the instant disclosure.

The following descriptions further illustrate the configurations and working principles of the image sensor 10 and the analog-to-digital converter array 11. Refer to FIG. 2. FIG. 2 shows a schematic diagram of an image sensor and an analog-to-digital converter array of one embodiment of the instant disclosure. The image sensor 10 comprises an image sensing array and a voltage supply array. The image sensing array comprises a plurality of pixels that forms a pixel array. The voltage supply array comprises a plurality of voltage supply circuits 101. The analog-to-digital converter array 11 comprises a plurality of comparators 110, a plurality of counters 111, a plurality of first capacitors C1 and a plurality of second capacitors C2. The first capacitors C1 and the second capacitors C2 are respectively connected to the inversing input ends and the non-inversing input ends of the comparators 110. The output ends of the comparators 110 are respectively connected to the counters 111. The output ends of the counters 111 are respectively connected to the image processing circuit 12. For ease in understanding, there are only one comparator 110, one counter 111, one first capacitor C1 and one second capacitor C2 shown in FIG. 2.

In this embodiment, the image sensing array has a configuration of the column analog-to-digital converter. Thus, the pixels in the same column are connected to the same comparator 110 and form a plurality of column pixel matrixes 100, wherein the column pixel matrixes 100 are arranged in parallel and form an image sensing array. In other words, the amount of the comparators 110 corresponds to the column number of the image sensing array. Moreover, a voltage supply circuit 101 is connected to the column pixel matrix 100 and the comparator 110, and thus the amount of the voltage supply circuits 101 also corresponds to the column number of the image sensing array. It should be noted that, for understanding easily, there is only one column pixel matrix 100 and one voltage supply circuit 101 shown in FIG. 2. However, the pixel number of the column pixel matrixes 100 and the amount of the voltage supply circuits 101 are not limited herein. In other embodiments, one voltage supply circuit 101 can be connected to a plurality of column pixel matrixes 100 and a plurality of comparators 101.

The image sensing array captures image data. The image sensing array can be set to support the rolling shutter mechanism or the global shutter mechanism. When the image sensing array is working under the rolling shutter mechanism, the pixels are exposed row by row, the image data signals PXO are generated, and the image data signals PXO are row by row provided to the analog-to-digital converter array 11. On the other hand, when the image sensor is working under the global shutter mechanism, all pixels are exposed simultaneously, and the exposed pixels row by row provide the image data signals PXO to the analog-to-digital converter array 11.

As shown in FIG. 2, the pixel in this embodiment has a four-transistor (4T) configuration. Each pixel comprises a light-sensing element PD, a floating diffusion region FD, a source follower SF, a row selection transistor RSL, a reset transistor RST and a transfer transistor TG One end of the light-sensing element PD is connected to the transfer transistor TG, and the other end of the light-sensing element PD is grounded. The transfer transistor TG is connected between the light-sensing element PD and the floating diffusion region FD. The gate of the source follower SF is connected to the floating diffusion region FD, and the drain of the source follower SF is connected to a power supply to receive the supplied power from the power supply VDD. The drain of the row selection transistor RSL is connected to source of the source follower SF, and the source of the row selection transistor RSL is connected to the comparator 110. The reset transistor RST is connected between the power supply VDD and the floating diffusion region FD. In addition, the gate of the transfer transistor TG, the gate of the reset transistor RST and the gate of the row selection transistor RSL are respectively connected to a driving circuit (not shown in FIG. 2).

The light-sensing element PD detects the incident light and correspondingly generates charges. The light-sensing element PD can be an electric element, such as a photo diode, a photo transistor, a photo-gate, a pinned photo diode or the combination thereof, which can convert the light to charges.

The floating diffusion region FD is composed of the parasitic capacitance between the light-sensing element PD and the source follower SF and/or the additional plug-in capacitance. The floating diffusion region FD receives and stores charges generated by the light-sensing element PD.

The transfer transistor TG selectively transfers the charges generated by the light-sensing element PD to the floating diffusion region FD. Specifically, the transfer transistor TG is controlled by the transferring signal output by the driving circuit. When the driving circuit outputs the transferring signal at low level to cut off the transfer transistor TG, the charges generated by the light-sensing element PD cannot be transferred to the floating diffusion region FD. When the driving circuit outputs the transferring signal at high level, the transfer transistor TG transfers the charges generated by the light-sensing element PD to the floating diffusion region FD, wherein the charges are stored and accumulated.

When turned on, the source follower SF has a gate voltage at its gate according to the charges output by the floating diffusion region, and correspondingly generates the image data signal PXO. The row selection transistor RSL receives the image data PXO signal, and selectively outputs the image data signal PXO to the comparator 110 according to the row selection signal RSEL output by the driving circuit.

The reset transistor RST selectively resets the floating diffusion region with the supplied voltage from the power supply VDD according to the reset signal output by the driving circuit. For example, when the reset signal is at low level, the reset transistor RST is cut off and thus the voltage of cathode of the light-sensing element PD drops. At this moment, the light-sensing element PD detects the incident light and correspondingly generates charges, and then the charges are stored in the floating diffusion region FD. When the reset signal is at low level, the reset transistor RST is turned on such that the voltage of the cathode of the light-sensing element PD is reset as the initial voltage (that is, the supplied voltage from the power supply VDD) to release and remove the charges left in the floating diffusion region. In other words, the floating diffusion region FD is reset.

It is worth mentioning that, in this embodiment, the pixels have a four-transistor (4T) configuration, but it is not limited herein. In other embodiments, the pixels can have a three-transistor (3T) configuration or a five-transistor (5T) configuration. If the pixels have a 3T configuration, the pixels do not comprise the transfer transistor TG If the pixels have a 5T configuration, the pixels further comprise a global shutter transistor, in addition to the light-sensing element PD, the floating diffusion region FD, the source follower SF, the row selection transistor RSL, the reset transistor RST and the transfer transistor TG Those skilled in the art should be familiar with the working principles regarding to the pixels having a 3T configuration or a 5T configuration, so the information is not repeated herein.

The voltage supply circuit 101 comprises proper logics, circuits and/or coding, and is configured to provide a dummy voltage $V_{dummy}$ to the comparator 110. The dummy voltage $V_{dummy}$ is a stable fixed voltage. The comparator 110 executes the auto-zero function according to the dummy voltage $V_{dummy}$, to overcome the mismatch resulted from the processing differences of the transistors of the comparators 110.

In this embodiment, the voltage supply circuit 101 is a shading pixel. For example, the shading pixel has the same configuration as the configuration of the above mentioned pixel, such as the 4T configuration. Different from the above mentioned pixel, the light-sensing element PD of the shading pixel is not influenced by the incident light because of being shaded. Thus, the voltage of the floating diffusion region FD of the shading pixel is stable. The shading pixel provides a stable dummy voltage $V_{dummy}$ to the comparator 110 according to the voltage of the floating diffusion region FD, and the comparator 110 executes the auto-zero function.

The configuration of the voltage supply circuit 101 is not limited in this embodiment. In other embodiments, the voltage supply circuit 101 can have a 3T configuration or a 5T configuration, or can be other circuits that can provide a stable voltage. However, for decreasing the manufacturing difficulty, the voltage supply circuit 101 is designed to have the same configuration as the configuration of the pixels in the image sensing array.

Figure 3:
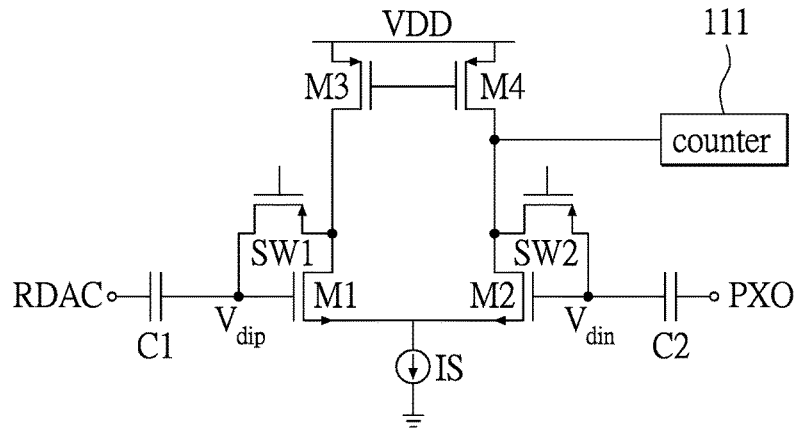
FIG. 3 shows a schematic diagram of a comparator of one embodiment of the instant disclosure.

The following descriptions further illustrate the configuration of the comparator 110. In conjunction with FIG. 2, FIG. 3 shows a schematic diagram of a comparator of one embodiment of the instant disclosure. The comparator 110 comprises a first transistor M1, a second transistor M2, a third transistor M3, a fourth transistor M4, a first switch transistor SW1, a second switch transistor SW2 and a current source IS. In this embodiment, the first transistor M1 and the second transistor M2 are NMOS transistors, and the third transistor M3 and the fourth transistor M4 are PMOS transistors.

The source of the first transistor M1 is connected to the current source IS, and the drain of the first transistor M1 is connected to the third transistor M3. The source of the second transistor M2 is connected to the current source IS, and the drain of the second transistor M2 is connected to the fourth transistor M4. The current source IS controls the current flowing through the first transistor M1 and the second transistor M2. The gate of the first transistor M1 is connected to the first capacitor C1. The gate of the second transistor M2 is connected to the second capacitor C2. The gate and drain of the fourth transistor M4 are mutually connected, and the drain of the fourth transistor M4 is further connected to the counter 111.

Additionally, the first switch transistor SW1 is electrically connected between the drain and gate of the first transistor M1. The second switch transistor SW2 is electrically connected between the drain and gate of the second transistor M2. In this embodiment, the first switch transistor SW1 and the second switch transistor SW2 are PMOS transistors, but it is not limited herein. In other embodiments, the first switch transistor SW1 and the second switch transistor SW2 can also be NMOS transistors. Those skilled in the art can determine and change the types of the first switch transistor SW1 and the second switch transistor SW2 according to the voltage requirements of the comparator 110.

The comparator 110 receives the ramp voltage RDAC via gate of the first transistor M1 and receives the image data signal PXO provided by the column pixel matrix 100 via the gate of the second transistor M2. The comparator 110 outputs a comparison result to the counter 111 according to the ramp voltage RDAC and the image data signal PXO.

It should be noted that, the above mentioned configuration of the comparator 110 is for illustrating but not for restricting the instant disclosure. In other embodiments, the comparator 111 can have different configurations.

Figure 4:
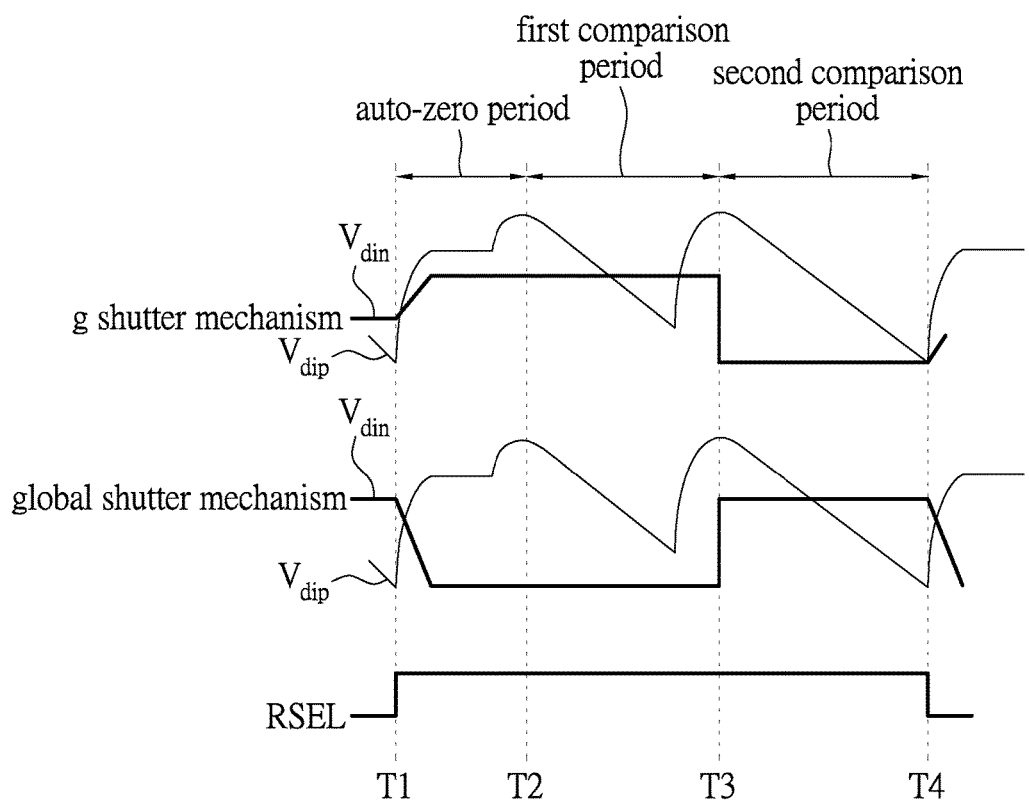
FIG. 4 shows a waveform diagram indicating the operation of a conventional comparator under the rolling shutter mechanism and the global shutter mechanism.

The following description illustrates the rolling shutter mechanism and the global shutter mechanism according to the configuration of the comparator 110 shown in FIG. 3. Refer to FIG. 4. FIG. 4 shows a waveform diagram indicating the operation of a conventional comparator under the rolling shutter mechanism and the global shutter mechanism. The ramp voltage RDAC has a fixed waveform. The comparator 110 can be set to support the rolling shutter mechanism or the global shutter mechanism. It should be noted that, in this embodiment, the image sensor 10 does not comprise the voltage supply array, or the voltage supply circuit 101 of the voltage supply array does not provide the dummy voltage $V_{dummy}$ to the comparator 110.

The descriptions to illustrate the operation when the image sensing array is working under the rolling shutter mechanism are as follows. The pixels in the image sensing array of the image sensor 10 are row by row exposed. At the timing T1, the comparator 110 executes the auto-zero function. After the pixels of the first row in the image sensing array have been exposed, the floating diffusion region FD has not yet received charges because the transfer transistors TG of the pixels have not yet been turned on. In other words, the voltages of the image data signal PXO outputted by the pixels equal to the reference voltage. The row selection transistor RSL of the pixel receives the row selection signal RSEL at high level such that the pixels start to provide the image data signal PXO at high level to the corresponding comparator 110. The first switch transistor SW1 and the second switch transistor SW2 of the comparator 110 are turned on, so the comparator 110 calibrates and records the offset voltages $V_{offset}$ among the first transistor M1, the second transistor M2, the third transistor M3 and the fourth transistor M4, and stores the offset voltages $V_{offset}$ in the first capacitor C1 and the second capacitor C2 to complete the auto-zero function. In other words, the duration from the timing T1 to the timing T2 refers to the auto-zero period of the comparator 110.

It is worth mentioning that, in the duration from the timing T1 to the timing T2, the voltage of the first terminal $V_{dip}$ of the comparator 110 is the difference between the supplied power provided by the power supply VDD and the working voltage $V_{th\_p}$ of the third transistor M3 (that is, VDD-$V_{th\_p}$), and the voltage of the second terminal $V_{din}$ of the comparator 110 is the difference between the supplied power VDD and the working voltage $V_{th\_p}$ of the fourth transistor M4 (that is, VDD-$V_{th\_p}$).

At the timing T2, the comparator 110 enters into the first comparison period. The offset voltage $V_{offset}$ is stored in the first capacitor C1, so the voltage of the first terminal $V_{dip}$ of the comparator 110 turns to be VDD-$V_{th\_p}$+$V_{offset}$. After that, the voltage of the first terminal $V_{dip}$ of the comparator 110 starts to drop with the decrease of the ramp voltage RDAC. The counter 111 starts to count for calculating the time consumption for the voltage of the first terminal $V_{dip}$ of the comparator 110 dropping to be less than the voltage of the second terminal $V_{din}$ of the comparator 110.

At this moment, the transfer transistor TG has not yet been turned on to transfer charges to the floating diffusion region FD, so the voltage of the image data signal PXO is the reference voltage which is at high level. Thus, the voltage of the second terminal $V_{din}$ of the comparator 110 maintains at VDD-$V_{th\_p}$. Once the voltage of the first terminal $V_{dip}$ of the comparator 110 drops to be less than the voltage of the second terminal $V_{din}$ of the comparator 110, the counter 111 stops counting and outputs the counting value to the image processing circuit. Thus, the counting value obtained by the counter 111 in the first comparison period corresponds to the offset voltage $V_{offset}$. The image processing circuit 12 converts the counting value to the gray level value of the image. Briefly, the image capture device 1 uses the counting value to represent the voltage of the image data signal, and then the image processing circuit 12 converts the time counting value to the gray level value.

Specifically, the ramp voltage RDAC is a step signal. The counting values generated by the counter 111 correspond to each step of the ramp voltage RDAC. For instance, the counting value "1" corresponds to the first step of the step signal, and the counting value "2" corresponds to the second step of the step signal. Moreover, the counting value can also correspond to one of the gray level values "0~255". Accordingly, the image processing circuit 12 can directly determine the binary gray level value of the image according to the counting value output by the counter 111.

In addition, the first switch transistor SW1 and the second switch transistor SW2 are cut off once the comparator enters into the comparison mode (that is, in the first comparison period or in the second comparison period).

At the timing T3, the comparator 110 enters into the second comparison period. The ramp voltage RDAC returns to be at the initial logic level. That is, the voltage of the first terminal $V_{dip}$ of the comparator 110 turns back to VDD-$V_{th\_p}$+$V_{offset}$. After that, the ramp voltage RDAC starts to drop such that the voltage of the first terminal $V_{dip}$ of the comparator 110 varies again. The counter 111 is reset and again starts to count. At this moment, the transfer transistors TG of the pixels in the first row in the image sensing array are turned on, such that the images captured by the pixels are transferred to the floating diffusion region FD. The pixels respectively output the image data signals PXO at low level. The image data signals PXO are coupled to the voltage of the second terminal $V_{din}$ of the comparator 110, such that the voltage of the second terminal $V_{din}$ of the comparator 110 turns VDD-$V_{th\_p}$-|ΔV|, wherein "ΔV" refers to the real image.

Likewise, the counter 111 calculates the time consumption for the voltage of the first terminal $V_{dip}$ of the comparator 110 dropping to be less than the voltage of the second terminal $V_{din}$ of the comparator 110, and outputs the counting value to the image processing circuit 12. The counting value obtained by the counter 111 in the second comparison period corresponds to the sum of the offset voltage and the real image, which is $V_{offset}$+|ΔV|.

In addition, in order to make sure that the comparator 110 can normally operate, the voltage of the current source IS is set to be less than the voltage of the voltage of the second terminal $V_{din}$ of the comparator 110, because once the voltage of the second terminal $V_{din}$ of the comparator 110 is less than the voltage of the current source IS, the current source IS cannot normally provide current to the elements of the comparator 110.

At the timing T4, the comparator 110 ends the second comparison period. The row selection signal RSEL turns to be at low level such that row selection transistor RSL is cut off. The image processing circuit 12 calculates the difference between the gray level values corresponding to the counting values respectively obtained in the first comparison period and the second comparison period, and the gray level value of the real image |ΔV| is obtained.

On the other hand, the following descriptions illustrate the operation of the comparator 110 under the global shutter mechanism. Under the global shutter mechanism, all pixels in the image sensing array of the image sensor 10 are simultaneously exposed, and the image sensing array row by row provides the image data signal PXO to the corresponding comparator 110. It is worth mentioning that, to support the rolling shutter mechanism, the voltage of the transistor in the comparator 110 is set to be at relatively high level.

At the timing T1, the comparator 110 executes the auto-zero function. The comparator 110 receives the image data signal PXO at low level because the pixels have captured images. The comparator 110 calibrates and records the offset voltages $V_{offset}$ among the first transistor M1, the second transistor M2, the third transistor M3 and the fourth transistor M4, and then stores the offset voltages $V_{offset}$ in the first capacitor C1 and the second capacitor C2 to complete the auto-zero function.

It is worth mentioning that, the voltage of the first terminal $V_{dip}$ of the comparator 110 is the difference between the supplied power VDD and the working voltage of the third transistor M3, which is VDD-$V_{th\_p}$. The voltage of the second terminal $V_{din}$ of the comparator 110 is the difference between the supplied power VDD and the working voltage of the fourth transistor M4, which is VDD-$V_{th\_p}$.

At the timing T2, the comparator 110 enters into the first comparison period. The voltage of the first terminal $V_{dip}$ of the comparator 110 is VDD-$V_{th\_p}$+$V_{offset}$, and the voltage of the first terminal $V_{dip}$ of the comparator 110 drops with the increase of the ramp voltage RDAC. The counter 111 starts to count for calculating the time consumption for the voltage of the first terminal $V_{dip}$ of the comparator 110 dropping to be less than the voltage of the second terminal $V_{din}$ of the comparator 110.

At the timing T3, the comparator 110 enters into the second comparison period. At this moment, the reset transistor RST of the pixel is turned on such that the floating diffusion region FD is reset. In other words, the comparator 110 receives the image data signal PXO at high level, which is the reference voltage. The voltage of the real image ΔV is coupled to the voltage of the second terminal $V_{din}$ of the comparator 110, such that the voltage of the second terminal $V_{din}$ of the comparator 110 turns to be VDD-$V_{th\_p}$+|ΔV|. From the above, the voltages of the second terminal $V_{din}$ of the comparator 110 vary as the comparator 110 operates under the rolling shutter mechanism and the global shutter mechanism, which results in the difficulty for designing the comparator 110.

On the other hand, the second capacitor C2 of the analog-to-digital converter array 11 has stored the offset voltages $V_{offset}$. At this moment, if the comparator 110 receives the image data signal PXO at high level, the second switch transistor SW2 will be incidentally turned on, which results in the loss of the charges in the second capacitor C2. Under this situation, the comparator 110 cannot complete the auto-zero function.

Moreover, the comparator 110 cannot work in its working voltage range because of receiving the image data signal PXO at high level. For example, each element of the comparator 110 consumes its working voltage, the working voltage range of the comparator 110 is 0~3.3V. In addition, the current source IS also consumes its working voltage, such as 0.5V, and the voltage of the second terminal $V_{din}$ of the comparator 110 cannot be less than the working voltage of the current source IS. Assuming that the voltage of the comparator 110 maintains at 2.8V and that the comparator 110 receives the image data signal PXO at high level, such as 0.6V, as a result the voltage of the comparator 110 will be over its working voltage range, and each element of the comparator 110 will not be able to work normally.

In order to solve the problems mentioned above, increasing the working voltage range of the comparator 110 can be a solution. However, if the working voltage range of the comparator 110 needs to be extended, the manufacturing cost will thus increase. Also, in practice, it is rare to set the working voltage range of the comparator 110 at high level.

Figure 5:
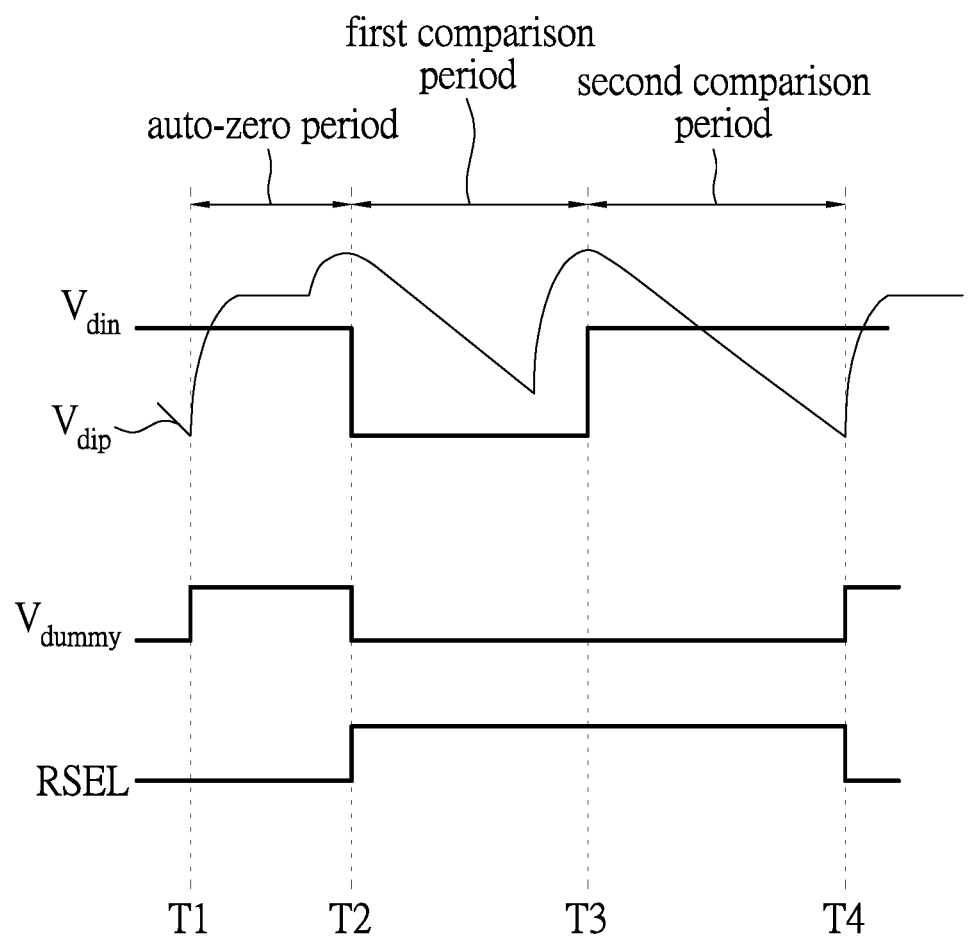
FIG. 5 shows a waveform diagram indicating the operation of a comparator of one embodiment of the instant disclosure.

Thus, a different solution is provided in the embodiments of the instant disclosure so as to make the image sensing array and the comparator 110 able to support both the rolling shutter mechanism and the global shutter mechanism. Refer to FIG. 5. FIG. 5 shows a waveform diagram indicating the operation of a comparator of one embodiment of the instant disclosure. Different from the embodiment shown in FIG. 4, the image sensor 10 in this embodiment further provides a dummy voltage $V_{dummy}$ to the image sensor 10 via the voltage supply array.

The following descriptions illustrate the operation of the image sensing array under the global shutter mechanism. At the timing T1, the comparator 110 enters into the auto-zero period to execute the auto-zero function. All pixels in the image sensing array of the image sensor 10 are simultaneously exposed. At this moment, the row selection signal RSEL maintains at low level such that the row selection transistor RSL is cut off and thus the image data signal PXO captured by the pixels will not be inputted to the comparator 110.

Instead, the voltage supply circuit 101 of the voltage supply array starts to provide the dummy voltage $V_{dummy}$ at high level to the corresponding comparator 110. The comparator 110 completes the auto-zero function according to the dummy voltage $V_{dummy}$ at high level, and stores the offset voltages in the first capacitor C1 and the second capacitor C2. At this moment, the voltage of the first terminal $V_{dip}$ of the comparator 110 and the voltage of the second terminal $V_{din}$ of the comparator 110 both equal to VDD-$V_{th\_p}$.

At the timing T2, the comparator 110 enters into the comparison mode. The voltage supply array stops providing the dummy voltage $V_{dummy}$. The voltage of the first terminal $V_{dip}$ of the comparator 110 is VDD-$V_{th\_p}$+$V_{offset}$, and the voltage of the first terminal $V_{dip}$ of the comparator 110 drops with the decrease of the ramp voltage RDAC. In addition, the row selection signal RSEL turns to be at high level to turn on the row selection transistor RSL. The pixels start to input the image data signals PXO to the comparator 110. At this moment, the voltage of the real image ΔV is coupled to the voltage of the second terminal $V_{din}$ of the comparator 110, such that the voltage of the second terminal $V_{din}$ of the comparator 110 turns to be VDD-$V_{th\_p}$-|ΔV|. Thus, the voltage of the second terminal $V_{din}$ of the comparator 110 equals to the voltage of the second terminal $V_{din}$ of the comparator 110 during the second comparison period shown in the above embodiment, wherein the image sensing array is working under the rolling shutter mechanism.

The comparator 110 compares the voltage of its first terminal $V_{dip}$ and the voltage of its second terminal $V_{din}$, and outputs a first comparison result to the counter 111. The counter 111 calculates the time consumption for the voltage of the first terminal $V_{dip}$ of the comparator 110 dropping to be less than the voltage of the second terminal $V_{din}$ of the comparator 110 according to the first comparison result, and outputs the corresponding counting value to the image processing circuit 12. The counting value obtained by the counter 111 corresponds to the sum of the offset voltage $V_{offset}$ and the absolute value of the real image, which is $V_{offset}+|\Delta V|$.

At the timing T3, the comparator 110 enters into the second comparison period, and the voltage of the first terminal $V_{dip}$ of the comparator 110 returns to be VDD-$V_{th\_p}+V_{offset}$. At this moment, the reset transistor RST of the pixel is turned on such that the floating diffusion region SD is reset. In other words, the comparator 110 receives the image data signal PXO at high level, which is the reference voltage. In addition, the voltage of the second terminal $V_{din}$ of the comparator 110 returns to be VDD-$V_{th\_p}$ that equals to the voltage of the second terminal $V_{din}$ of the comparator 110 during the first comparison period in the above embodiment, wherein the image sensing array is working under the rolling shutter mechanism. Thereby, the voltages of the second terminal $V_{din}$ of the comparator 110 are the same as the comparator 110 operating under the rolling shutter mechanism and the global shutter mechanism. Thus, no matter if the image sensor 10 is working under the rolling shutter mechanism or the global shutter mechanism, the image capture device 1 can use the same analog-to-digital converter array 11 and the image processing circuit 12 to process the image data signals PXO.

The comparator 110 compares the voltage of its first terminal $V_{dip}$ and the voltage of its second terminal $V_{din}$, and outputs a second comparison result to the counter 111. The counter 111 calculates the time consumption for the voltage of the first terminal $V_{dip}$ of the comparator 110 dropping to be less than the voltage of the second terminal $V_{din}$ of the comparator 110 according to the second comparison result, and outputs the corresponding counting value to the image processing circuit 12. The counting value obtained by the counter 111 corresponds to the offset voltage $V_{offset}$.

At timing T4, the comparator 110 ends the second comparison period. The row selection signal RSEL turns to be at low level such that the row selection transistor RSL is cut off. The image processing circuit 12 calculates the difference between the gray level values corresponding to the counting values obtained in the first comparison period and the second comparison period, to obtain the gray level value of the real image $|\Delta V|$.

Thereby, as the image sensing array operates under the global shutter mechanism, the comparator 110 can still work normally such that the image processing circuit 12 can obtain the real image $|\Delta V|$ according to the image data signal PXO provided by the image sensing array.

In addition, as the image sensing array operates under the rolling shutter mechanism, the voltage supply circuit 101 also can provide the dummy voltage $V_{dummy}$ at high level to the corresponding comparator 110 such that the comparator 110 can complete the auto-zero function; however, it is not limited herein. In other words, when the image sensing array is working under the rolling shutter mechanism, the corresponding transfer transistors TG of the pixels will be turned on after the comparator 110 has completed the auto-zero function. During the auto-zero period, the pixels still provide the voltage signal at high level to the comparator 110 for executing the auto-zero function. Thus, when the image sensing array is working under rolling shutter mechanism, the voltage supply circuit 101 does not need to provide the dummy voltage $V_{dummy}$ to the comparator 110.

To sum up, in the image sensor and the image capture device using the same provided by the instant disclosure, the voltage supply array can provide a stable dummy voltage to the comparator of the analog-to-digital converter array. The image capture device uses the same analog-to-digital converter array and the same image processing circuit which can support both the rolling shutter mechanism and the global shutter mechanism, to generate images. Compared with conventional image capture devices, the image sensor and the image capture device using the same provided by the instant disclosure have a simplified circuit design which decreases the manufacturing difficulty and the manufacturing cost.

Moreover, in the image sensor and the image capture device using the same provided by the instant disclosure, the image data captured by the image sensor are converted to the binary image data signals via the counter of the analog-to-digital converter array. The image processing circuit executes the binary data calculation, so there will be no time consumption for additionally executing the format conversion.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An image sensor, connected to an analog-to-digital converter array, wherein the analog-to-digital converter array comprises a plurality of comparators, the image sensor comprising:
    an image sensing array, capturing image data, comprising a plurality of pixels, wherein the image sensing array supports both a rolling shutter mechanism and a global shutter mechanism; and
    a voltage supply array, connected to the analog-to-digital converter array, comprising a plurality of voltage supply circuits to provide a dummy voltage;
    wherein during an auto-zero period, the voltage supply array provides the dummy voltage to the analog-to-digital converter array, the comparators execute an auto-zero function according to the dummy voltage, the image sensing array outputs the image data to the analog-to-digital converter array after the comparators complete the auto-zero function, and the analog-to-digital converter array makes the image data be digital.

2. The image sensor according to claim 1, wherein the analog-to-digital converter array further comprises:
    a plurality of counters, respectively connected to output ends of the comparators, the counting values of the counters increasing with time;
    wherein the output ends of the counters are connected to an image processing circuit, and the image processing circuit determines gray level values of the digital image data according to the counting values output by the counters.

3. The image sensor according to claim 2, wherein the comparators respectively enter into a comparison mode after completing the auto-zero function, during a first comparison period, the image sensing array provides part of the image data row by row to the analog-to-digital converter array, the comparators respectively compare the image data with a ramp voltage and output a first comparison result to the corresponding counters, the counters adjust the counting values according to the first comparison results, and the counters stop counting and output the current counting values to the image processing circuit if the first comparison result indicates that the ramp voltage is less than the voltage of the image data.

4. The image sensor according to claim 3, wherein during a second comparison period, the image sensing array resets a floating diffusion region of each pixel and provides a reference voltage row by row to the analog-to-digital converter array, the comparators respectively compare the reference voltage with the ramp voltage and output a second comparison result to the corresponding counters, and the counters stop counting and output the current counting values to the image processing circuit if the second comparison result indicates that the ramp voltage is less than the reference.

5. The image sensor according to claim 4, wherein the image processing circuit respectively calculates the gray level value of the image data and the gray level value of the reference voltage according to the counting values provided by the counters during the first comparison period and the second comparison period, and the image processing circuit calculates the difference between the gray level value of the image data and the gray level value of the reference voltage to obtain the gray level value of a real image.

6. The image sensor according to claim 1, wherein the amount of the comparators corresponds to the column number of the image sensing array, and the pixels in the same column in the image sensing array are connected to the same comparator.

7. The image sensor according to claim 1, wherein the image sensing array is a CMOS image sensing array.

8. The image sensor according to claim 1, wherein the pixels respectively have a three-transistor configuration, a four-transistor configuration or a five-transistor configuration.

9. The image sensor according to claim 1, wherein the plurality of voltage supply circuits comprise:
a plurality of shading pixels, respectively connected to the comparators to provide the dummy voltage to the comparators;
wherein light-sensing elements of the shading pixels are shaded such that voltages of floating diffusion regions of the shading pixels are stable, and the shading pixels provide an stable dummy voltage according to the voltages of the floating diffusion regions.

10. The image sensor according to claim 9, wherein the shading pixels respectively have a three-transistor configuration, a four-transistor configuration or a five-transistor configuration.

11. An image capture device, comprising:
an image capture sensor, comprising a plurality of comparators; and
an image sensor, connected to the analog-to-digital converter array, comprising:
an image sensing array, capturing image data, comprising a plurality of pixels, wherein the image sensing array supports both a rolling shutter mechanism and a global shutter mechanism; and
a voltage supply array, connected to the analog-to-digital converter array, comprising a plurality of voltage supply circuits to provide a dummy voltage;
wherein during an auto-zero period, the voltage supply array provides the dummy voltage to the analog-to-digital converter array, the comparators execute an auto-zero function according to the dummy voltage, the image sensing array outputs the image data to the analog-to-digital converter array after the comparators complete the auto-zero function, and the analog-to-digital converter array converts the image data to digital image data.

12. The image capture device according to claim 11, wherein the analog-to-digital converter array further comprises:
a plurality of counters, respectively connected to output ends of the comparators, the counting values of the counters increasing with time;
wherein the output ends of the counters are connected to an image processing circuit, and the image processing circuit determines gray level values of the digital image data according to the counting values output by the counters.

13. The image capture device according to claim 12, wherein the comparators respectively enter into a comparison mode after completing the auto-zero function, during a first comparison period, the image sensing array provides part of the image data row by row to the analog-to-digital converter array, the comparators respectively compare the image data with a ramp voltage and output a first comparison result to the corresponding counters, the counters adjust the counting values according to the first comparison results, and the counters stop counting and output the current counting values to the image processing circuit if the first comparison result indicates that the ramp voltage is less than the voltage of the image data.

14. The image capture device according to claim 13, wherein during a second comparison period, the image sensing array resets a floating diffusion region of each pixel and provides a reference voltage row by row to the analog-to-digital converter array, the comparators respectively compare the reference voltage with the ramp voltage and output a second comparison result to the corresponding counters, and the counters stop counting and output the current counting values to the image processing circuit if the second comparison result indicates that the ramp voltage is less than the reference.

15. The image capture device according to claim 14, wherein the image processing circuit respectively calculates the gray level value of the image data and the gray level value of the reference voltage according to the counting values provided by the counters during the first comparison period and the second comparison period, and the image processing circuit calculates the difference between the gray level value of the image data and the gray level value of the reference voltage to obtain the gray level value of a real image.

16. The image capture device according to claim 11, wherein the amount of the comparators corresponds to the column number of the image sensing array, and the pixels in the same column in the image sensing array are connected to the same comparator.

17. The image capture device according to claim 11, wherein the image sensing array is a CMOS image sensing array.

18. The image capture device according to claim 11, wherein the pixels respectively have a three-transistor configuration, a four-transistor configuration or a five-transistor configuration.

19. The image capture device according to claim 11, wherein the plurality of voltage supply circuits comprise:
a plurality of shading pixels, respectively connected to the comparators to provide the dummy voltage to the comparators;
wherein light-sensing elements of the shading pixels are shaded such that voltages of floating diffusion regions of the shading pixels are stable, and the shading pixels provide an stable dummy voltage according to the voltages of the floating diffusion regions.

20. The image capture device according to claim 19, wherein the shading pixels respectively have a three-transistor configuration, a four-transistor configuration or a five-transistor configuration.

\* \* \* \* \*